United States Patent
Wang et al.

(10) Patent No.: US 11,544,567 B2
(45) Date of Patent: Jan. 3, 2023

(54) NETWORK STRUCTURE PROCESSING METHOD AND DEVICE AND RELATED PRODUCTS

(71) Applicant: Cambricon Technologies Corporation Limited, Beijing (CN)

(72) Inventors: Jin Wang, Beijing (CN); Shijin Zhang, Beijing (CN); Xiao Zhang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 487 days.

(21) Appl. No.: 16/713,748

(22) Filed: Dec. 13, 2019

(65) Prior Publication Data
US 2020/0210837 A1    Jul. 2, 2020

(51) Int. Cl.
*G06N 3/08*    (2006.01)
*G06N 3/04*    (2006.01)

(52) U.S. Cl.
CPC .............. *G06N 3/082* (2013.01); *G06N 3/04* (2013.01)

(58) Field of Classification Search
CPC ......... G06N 3/04; G06N 3/0454; G06N 3/082
See application file for complete search history.

(56) References Cited

U.S. PATENT DOCUMENTS

2020/0293295 A1*  9/2020  Gao ................. G06F 11/3457
2020/0394425 A1* 12/2020  Misra ................. G06K 9/6218

FOREIGN PATENT DOCUMENTS

| CN | 107239315 A | 10/2017 |
| CN | 108230354 A | 6/2018 |
| CN | 108701250 A | 10/2018 |
| CN | 109063829 A | 12/2018 |

OTHER PUBLICATIONS

ECCV; "SSD: Single Shot MuliBox Detector", European Conference on Computer Vision, 2016, 21 pages.

* cited by examiner

*Primary Examiner* — Ross Varndell
(74) *Attorney, Agent, or Firm* — Getech Law LLC; Jun Ye

(57) ABSTRACT

The disclosure relates to a network structure processing method and device and a related product, including: obtaining, by a computer device, an optimization instruction; and executing a corresponding optimization processing operation on the network structure according to the optimization level in the optimization instruction to obtain an optimized network structure. According to the processing method of the network structure, the resource cost can be reduced, and the detection rate of the network structure on images is improved.

11 Claims, 9 Drawing Sheets

NETWORK STRUCTURE PROCESSING METHOD AND DEVICE AND RELATED PRODUCTS

TECHNICAL FIELD

The present disclosure relates to the technical field of information technology, and in particularly to a network structure processing method, a device, and a related product.

BACKGROUND

With the development of machine learning network technology, people are setting further requirements on the performance of machine learning networks. For instance, the performance of machine learning networks should include resource overhead, operation time, operation rate, reliability, operation precision, and the like.

Since a detection network SSD has good detection precision in the field of image detection, it has become a commonly used machine learning network that is used to implement image detection and recognition. An existing detection network SSD includes network structure layers of various types, and data transformation operation layers under the network structure layers. In an MLU chip, due to special data placement and other reasons, some data transformation operation layers do not need to be executed compulsively. In this case, those network structure layers are collectively called a redundant layer. Instances include the data transformation operation layers such as Permute, Reshape, and Flatten. If the redundant layer exists in the detection network SSD, it may cause a large amount of resource overhead during data processing, and may reduce the detection rate.

SUMMARY

Considering the above-mentioned situation, the present disclosure provides a network structure processing method, a device, and a related product that may reduce resource overhead and improve detection rate.

In a first aspect, an example of the present disclosure provides a network structure processing method including:
obtaining an optimization instruction; and
optimizing a network structure according to an optimization level in the optimization instruction.

In a second aspect, an example of the present disclosure provides a network structure processing device including:
an obtaining module configured to obtain an optimization instruction; and
an optimization module configured to optimize a network structure according to an optimization level in the optimization instruction.

In a third aspect, an example of the present disclosure provides a machine learning chip including the network structure processing device of the second aspect.

In a fourth aspect, an example of the present disclosure provides a chip package structure including the machine learning chip of the third aspect.

In a fifth aspect, an example of the present disclosure provides a board card including the chip package structure of the fourth aspect.

In a sixth aspect, an example of the present disclosure provides an electronic device including the board card of the fifth aspect.

Regarding the network structure processing method, the device, and the related product, the network structure processing method includes the optimization instruction for optimizing the network structure, and the optimization level in the optimization instruction implements different optimization operations on the network structure. In this case, compared with the existing network structure, the complexity of the optimized network structure is lower. Therefore, the system resource overhead may be reduced, and the detection rate of the network structure may be improved.

DETAILED DESCRIPTION

Technical solutions in examples of the present disclosure will be described clearly and completely hereinafter with reference to the accompanied drawings in the examples of the present disclosure. Obviously, the examples to be described are merely some rather than all examples of the present disclosure. All other examples obtained by those of ordinary skill in the art based on the examples of the present disclosure without creative efforts shall fall within the protection scope of the present disclosure.

Terms such as "first", "second", "third", and "fourth" in the specification, the claims, and the drawings are used for distinguishing different objects rather than describing a specific order. In addition, terms such as "include", "have", and any variant thereof are used for indicating non-exclusive inclusion. For instance, a process, a method, a system, a product, or an equipment including a series of steps or units is not limited to the listed steps or units, but optionally includes steps or units that are not listed, or optionally includes other steps or units inherent to the process, the method, the product, or the equipment.

Reference to "example" means that a particular feature, a structure, or a characteristic described in conjunction with the example may be included in at least one example of the present disclosure. The appearances of the term in various places in the specification do not necessarily all refer to the same example, nor are they independent or alternative examples that are mutually exclusive with other examples. It is explicitly and implicitly understood by those skilled in the art that the examples described in the specification may be combined with other examples.

Figure 1:
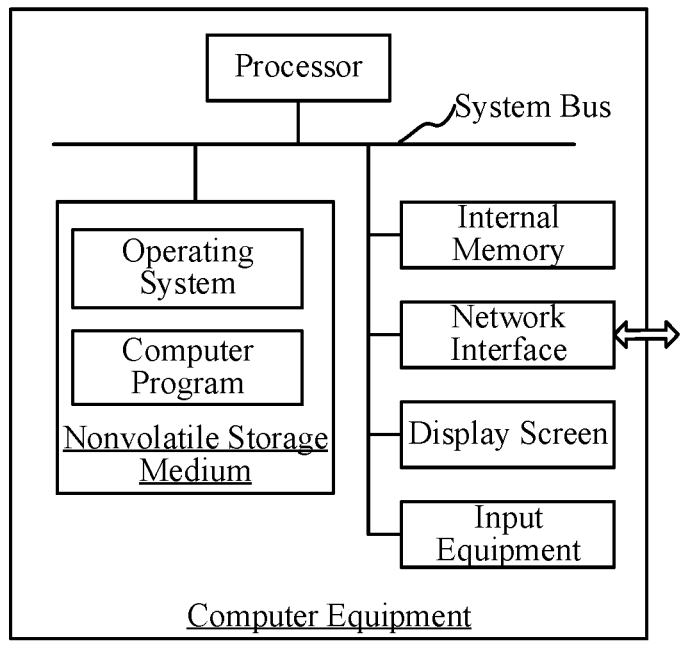
FIG. 1 is an internal structural diagram of a computer equipment of an example of the present disclosure.

A network structure processing method provided by the present disclosure may be applied to a computer equipment shown in FIG. 1. The computer equipment may be a terminal of which a structure is as shown in FIG. 1. The computer equipment may include a processor, a memory, a network interface, a display screen, and an input device which are connected by a system bus. The processor of the computer equipment is configured to provide computing and controlling capabilities. The memory of the computer equipment includes a nonvolatile storage medium and an internal memory. The nonvolatile storage medium may have an operating system and a computer program. The internal memory is configured to provide an environment for running an operating system and a computer program of the nonvolatile storage medium. The network interface of the computer equipment is configured to communicate with an external terminal through network connection. When the processor executes the computer program, the processor implements a network structure processing method. The display screen of the computer equipment may be a liquid crystal display screen or an electronic ink display screen. An input equipment of the computer equipment may be a touch surface layered on the display screen, or may be a button, a trackball, or a touch pad arranged on a case of the computer equipment, or may further be a keyboard, a touch pad, and a mouse externally connected to the computer equipment.

Those skilled in the art can understand that the structure shown in FIG. 1 is merely a block diagram of part of the structure related to the present disclosure, and are not to be considered as a limitation on the computer equipment to which a scheme of the present disclosure is applied. The computer equipment may include more or less components than the components shown in the figure, or may combine some components, or may have a different layout for those components.

Figure 2:
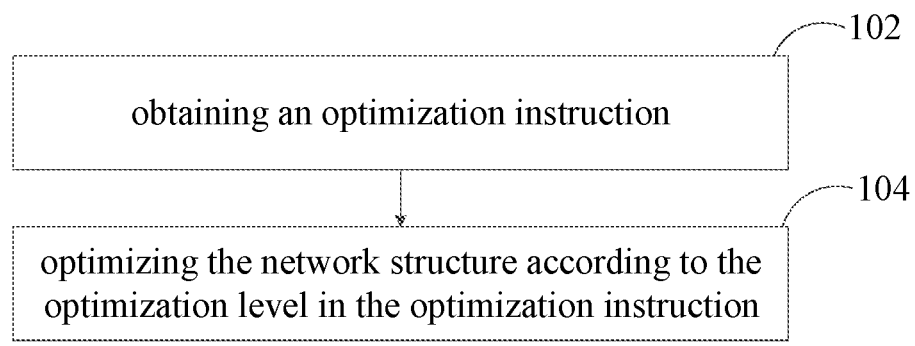
FIG. 2 is a flowchart of a network structure processing method of an example of the present disclosure.

FIG. 2 is a flowchart of a network structure processing method of an example of the present disclosure. A body for executing the method is the computer equipment shown in FIG. 1. The method relates to a process of optimizing a network structure by the computer equipment. As shown in FIG. 2, the method includes:

a step 102, obtaining an optimization instruction.

The optimization instruction is configured to instruct the computer equipment to optimize the network structure.

If the computer equipment needs to use the network structure to detect an image, the computer equipment may first obtain the optimization instruction input by users, and then optimize the network structure according to a method indicated by the optimization instruction. The computer equipment may optimize a structure of the network structure. Optionally, the computer equipment may optimize both the structure of the network structure and model parameters of the network structure.

It needs to be explained that there are various methods of obtaining the optimization instruction by the computer equipment. For instance, users may input the optimization instruction on the computer equipment by editing a command. Optionally, users may also input the optimization instruction on the computer equipment by setting parameters. For instance, when the computer equipment uses the network structure to detect an image under the Caffe framework, the computer equipment may add a parameter opt_level for indicating the optimization level to Caffe.proto. Different values of the parameter opt_level indicate different optimization levels. Based on the implementation above, the computer equipment may obtain the corresponding optimization instruction by setting the value of the parameter opt_level. For instance, when the value of opt_level is set to 0, the computer equipment uses the network structure of the initial design to detect an image directly without optimizing the network structure; when the value of opt_level is set to 1, the computer equipment only optimizes the structure of the network structure; and when the value of opt_level is set to 2 and the network structure meets a preset ConvBnScale optimization condition, such as the network structure includes at least one network structure of: a structure with two continuous layers including a convolution layer and a batch norm layer, a structure with two continuous layers including a convolution layer and a scale layer, and a structure with three continuous layers including a convolution layer, a batch norm layer, and a scale layer, the computer equipment not only optimizes the structure of the network structure, but also optimizes the model parameters included in the network structure, however, if the network structure does not meet the preset ConvBnScale optimization condition, the computer equipment only optimizes the structure of the network structure.

The method also includes: a step 104, optimizing the network structure according to the optimization level in the optimization instruction.

The optimization level indicates a method of optimizing the network structure by the computer equipment. The optimization level may include several types of optimization levels. Different optimization levels may indicate different optimization methods. The optimization instruction is used for instructing the computer equipment to optimize the network structure.

In certain applications, users may preset the optimization level according to their demands, and then input the optimization instruction carrying the optimization level into the computer equipment. After obtaining the optimization instruction, the computer equipment may determine an optimization operation to be performed on the network structure according to the optimization level set by users, and then optimize the network structure by adopting a corresponding method of the optimization operation to obtain the network structure that satisfies the users' demands.

Regarding the network structure processing method, the device, and the related product, the network structure processing method includes the optimization instruction for optimizing the network structure, and the optimization level in the optimization instruction implements different optimization operations on the network structure. In this case, compared with the existing network structure, the complexity of the optimized network structure is lower. Therefore, the system resource overhead may be reduced, and the detection rate of the network structure may be improved.

Optionally, as described in the example above that the optimization level in the optimization instruction may be of various types, when the optimization level is a first optimization level, the method may include deleting a redundant layer in the network structure to obtain a first optimized network structure.

The first optimization level is for instructing the computer equipment to optimize the structure of the network structure. The redundant layer may be a structure layer included in the network structure, and may be a plurality of structure layers included in the network structure. In certain applications, the redundant layer may be a structure layer which is preset to be deleted according to certain application demands, or according to functional requirements of users on the network structure. For instance, the redundant layer may be a default box configuration layer, a splicing layer, and the like. Optionally, in an MLU chip, due to special data placement and other reasons, some data transformation operation layers do not need to be executed compulsively. In this case, the redundant layer may be some data transformation operation layers. Instances include the data transformation operation layers such as permute, reshape, and flatten. The first optimized network structure refers to a network structure of which the structure is optimized.

When the optimization level obtained by the computer equipment is the first optimization level, and the computer equipment optimizes the structure of the network structure, the computer equipment may identify redundant layers in the network structure according to certain application demands or according to functional demands of users on the network structure, delete the redundant layers, and readjust the network structure after the redundant layers are deleted to obtain the first optimized network structure that satisfies certain application demands.

Optionally, if the optimization level is a second optimization level, the network structure includes at least one network structure of: a structure with two continuous layers including a convolution layer and a batch norm layer, a structure with two continuous layers including a convolution layer and a scale layer, and a structure with three continuous layers including a convolution layer, a batch norm layer, and a scale layer, the method may include deleting the redundant layer in the network structure, and optimizing the model parameters in the convolution layer to obtain a second optimization network structure.

The second optimization level is for instructing the computer equipment to optimize the model parameters of the convolution layer of the network structure. An existing convolution neural network structure may include a structure with two continuous layers which are a convolution layer and a batch norm layer, a structure with two continuous layers which are a convolution layer and a scale layer, and a structure with three continuous layers which are a convolution layer, a batch norm layer, and a scale layer. The convolution neural network structure may be used for detecting input image data.

When the computer equipment optimizes a network structure as instructed by the second optimization level, the computer equipment may first detect a type of a structure included in the network structure. If the network structure includes one, two, or even three of the following structures: a structure with two continuous layers which are a convolution layer and a batch norm layer, a structure with two continuous layers which are a convolution layer and a scale layer, and a structure with three continuous layers which are a convolution layer, a batch norm layer, and a scale layer, the computer equipment performs the step 104 to obtain a first optimized network structure, optimizes model parameters in the convolution layer in the first optimized network structure to obtain a second optimized network structure. In other words, the computer equipment optimizes the structure of the network structure as well as the model parameters in the convolution layer in the network structure.

Optionally, if the optimization level is the second optimization level, there is another application. In this application, the network structure does not include any of the following network structures: a structure with two continuous layers including a convolution layer and a batch norm layer, a structure with two continuous layers including a convolution layer and a scale layer, and a structure with three continuous layers including a convolution layer, a batch norm layer, and a scale layer. The computer equipment may delete a redundant layer in the network structure to obtain the first optimization network structure.

The present example relates to a case where the computer equipment obtains the second optimization level, and the network structure does not include any of the following structures: a structure with two continuous layers including a convolution layer and a batch norm layer, a structure with two continuous layers including a convolution layer and a scale layer, and a structure with three continuous layers including a convolution layer, a batch norm layer, and a scale layer. In this application, the computer equipment performs the step 104 directly to optimize the network structure to obtain the first optimized network structure. In other words, the computer equipment only optimizes the structure of the network structure.

Regarding the process of optimizing the model parameters in the network structure mentioned in the example above, the example below will use a convolution neural network for explanation. The convolution neural network optimization method may be applied to a convolution neural network optimization system 100 shown in FIG. 3. The convolution neural network optimization system 100 includes: a memory 100 and a processor 120. An instruction executable by the processor 120 is stored in the memory 110. The memory 110 may be used for on-chip storage and off-chip storage. The processor 120 includes a plurality of processor cores. Each of the processor cores may communicate with other cores via an internal bus and perform different tasks.

Optionally, if the convolution neural network structure includes a structure with two continuous layers including a convolution layer and a batch norm layer, an example provides an optimization processing method of the convolution neural network structure. As shown in FIG. 4, the method may be used on the convolution neural network optimization system 100 of FIG. 3. The method includes:

a step 202, obtaining configuration parameters.

The configuration parameters include first training parameters and second training parameters of a batch norm layer. Specifically, the first training parameters and the second training parameters for performing convolution computations of the batch norm layer may be obtained from a Caffe model.

Furthermore, Caffe refers to a convolution neural network framework, which is a commonly used deep learning framework. A Caffe source code file supports configuration and modification. In other words, a model may be redefined and optimized when Caffe is being configured. A Caffe model refers to a mathematic model obtained by using a machine learning algorithm to perform training.

The method includes a step 204, fusing the first training parameters of the batch norm layer and weight parameters of a convolution layer to obtain a first fusion result.

Specifically, the method may include: fusing the first training parameters of the batch norm layer obtained in the step 202 and the weight parameters of the convolution layer to obtain the first fusion result.

As an optional example, the first training parameters of the batch norm layer include at least one first training sub-parameter for performing the convolution computations of the batch norm layer.

Specifically, if the first training parameters of the batch norm layer include a plurality of first training sub-parameters, the method includes performing fusion computations on all the first training sub-parameters of the batch norm layer and the weight parameters of the convolution layer.

The method includes a step 206, fusing the second training parameters of the batch norm layer and bias parameters of the convolution layer to obtain a second fusion result.

Specifically, the method may include: performing fusion computations on the second training parameters of the batch norm layer obtained in the step 202 and the bias parameters of the convolution layer to obtain the second fusion result.

As an optional example, the second training parameters of the batch norm layer include at least one second training sub-parameter for performing the convolution computations of the batch norm layer.

Specifically, if the second training parameters of the batch norm layer include a plurality of second training sub-parameters, the method includes performing fusion computations on all the second training sub-parameters of the batch norm layer and the bias parameters of the convolution layer.

The method includes a step 208, optimizing the convolution neural network according to the first fusion result and the second fusion result.

Specifically, the convolution neural network may be optimized according to the first fusion result obtained in the step 204 and the second fusion result obtained in the step 206.

By using the convolution neural network optimization method, the computations of the batch norm layer are fused into the convolution layer. The network performance may be greatly improved without network precision loss. At the same time, redundant neural network layers are deleted after the network fusion, which may simplify the network structure and improve the operation speed of network.

In an example, the method includes multiplying the first training parameters of the batch norm layer by the weight parameters of the convolution layer to obtain the first fusion result.

Figure 4:
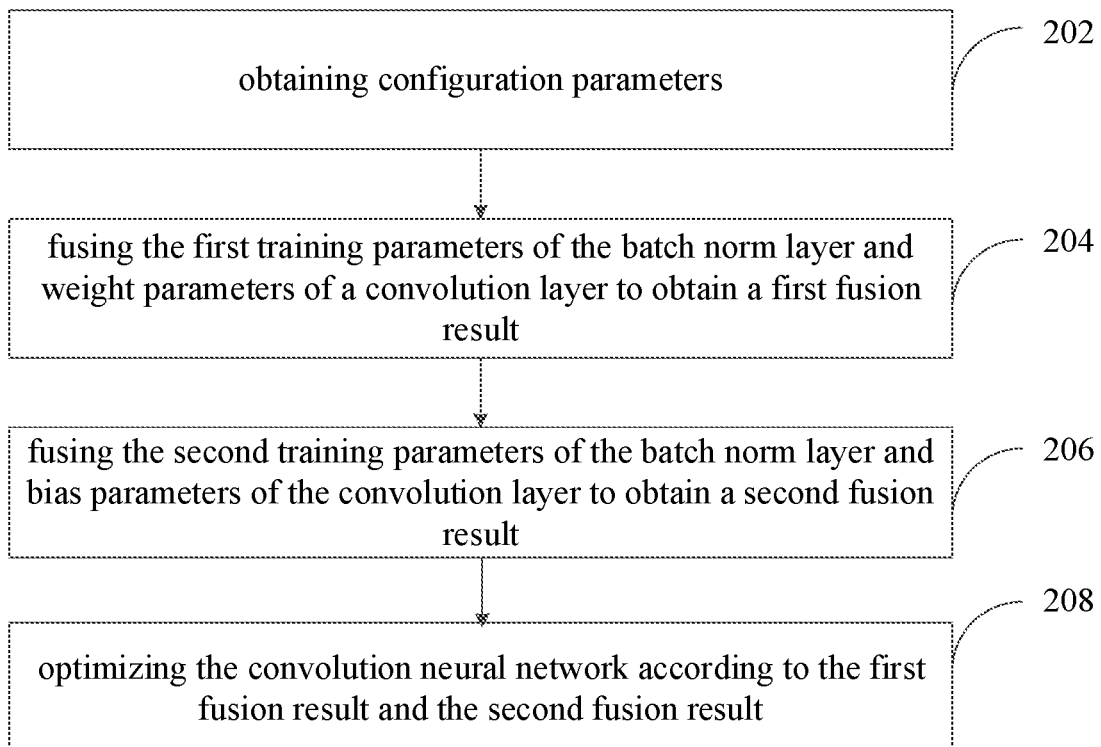
FIG. 4 is a flowchart of an optimization processing method of a convolution neural network of an example of the present disclosure.
Figure 4A:
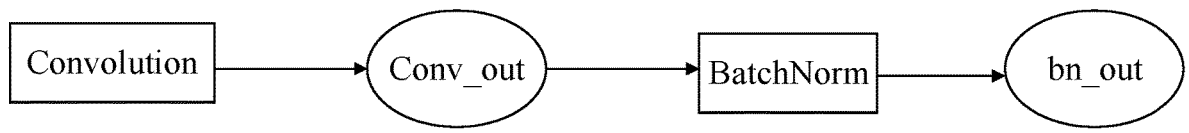
FIG. 4A is a diagram of a structure of a convolution neural network of an example of the present disclosure.

As shown in FIG. 4A, a structure with two continuous layers including a convolution layer and a batch norm layer may be optimized to a structure with one convolution layer. In other words, computations of the batch norm layer may be fused into the convolution layer, then the batch norm layer may be deleted.

The batch norm layer is used for normalizing input data, which can be represented as $$x_{norm} = \frac{x \cdot \mu}{\sigma}.$$

x denotes the input data of the batch norm layer. $x_{norm}$ denotes normalized output data of the batch norm layer. $\mu$ denotes a mean value of accumulation computations. $\sigma$ denotes a variance of accumulation computations.

The above-mentioned normalization is mainly a process of simplifying data. It can map the input data to the range [0,1] or [−1,1] and transform a dimensional expression into a dimensionless expression to obtain a scalar. The process may facilitate comparison and weighting of indicators with different units or magnitudes, thereby making data processing easier and faster.

For instance, a computation formula of the batch norm layer is $$\mathrm{alpha} * \frac{(x - \mathrm{mean} * \mathrm{scale})}{sqrt(\mathrm{var} * \mathrm{scale})} + \mathrm{beta}.$$

The computation formula is simplified to obtain a formula (1), which is:

$$\frac{\mathrm{alpha}}{sqrt(\mathrm{var} * \mathrm{scale})} x - \mathrm{alpha} * \mathrm{mean} * sqrt\left(\frac{\mathrm{scale}}{\mathrm{var}}\right) + \mathrm{beta}. \quad (1)$$

A training process of the batch norm layer is as follows: obtaining mini-batch samples from all samples to perform forward training for a plurality of times, and updating computation parameters in the Caffe model by means of moving average.

Specifically, in order to fuse the computation process of the batch norm layer into the convolution layer, the first training parameters and the second training parameters for the convolution computations of the batch norm layer may be obtained. Referring to the formula (1), the first training parameters for performing the convolution computations of the batch norm layer include a plurality of first training sub-parameters (alpha,var,scale). The second training parameters for performing the convolution computations of the batch norm layer include a plurality of second training sub-parameters (alpha,mean,var,scale,beta).

The first training parameters or the second training parameters (alpha,mean,var,scale,beta) are vectors. The Caffe model may have more than one type of the first training parameters or the second training parameters. For instance, if the Caffe model has a plurality of first training sub-parameters alpha, then all alpha in the Caffe model may be obtained.

Specifically, referring to the formula (1), the method includes multiplying the plurality of first training sub-parameters (alpha,var,scale) in the first training parameters by weights of the convolution layer. In other words, the data part in the formula (1) is multiplied by the weights of the convolution layer $$\frac{\mathrm{alpha}}{sqrt(\mathrm{var} * \mathrm{scale})}$$

to obtain the first fusion result $$\frac{\mathrm{alpha}}{sqrt(\mathrm{var} * \mathrm{scale})} * \mathrm{weights}.$$

In an example, the method includes adding the second training parameters of the batch norm layer and the bias parameters of the convolution layer to obtain the second fusion result.

For instance, still referring to the formula (1), the method includes multiplying the plurality of second training sub-parameters (alpha,mean,var,scale,beta) in the second training parameters of the batch norm layer by the bias of the convolution layer. In other words, the data part $$-alpha * mean * sqrt\left(\frac{scale}{var}\right) + beta$$

in the formula (1) is multiplied by the bias of the convolution layer to obtain the second fusion result $$-alpha * mean * sqrt\left(\frac{scale}{var}\right) + beta + bias.$$

In an example, the method includes deleting the batch norm layer, changing the weight parameters of the convolution layer to the first fusion result, and changing the bias parameters of the convolution layer to the second fusion result.

In a multi-layer neural network, a batch norm layer is a network structure that is of less importance for model inference. For instance, a lightweight convolution neural network Mobile Net has a large number of structures with continuous convolution layer and batch norm layer. During forward propagation, building and executing the batch norm layers may consume a lot of computing resources, but bring repetition and complexity to the network structure. In this case, after the step 204 and the step 206, the convolution computations of the batch norm layers are fused into the convolution layers, then the batch norm layers may be deleted.

Furthermore, the weight parameters of the convolution layers may be changed to the first fusion result obtained in the step 204. Referring to the formula (1), the weight parameters of the convolution layers are changed to the first fusion result $$\frac{alpha}{sqrt(var * scale)} * weights.$$

The bias parameters of the convolution layers may be changed to the second fusion result obtained in the step 206. Referring to the formula (1), the bias parameters of the convolution layers are changed to the second fusion result $$-alpha * mean * sqrt\left(\frac{scale}{var}\right) + beta + bias.$$

In this way, the normalization performed by the batch norm layers is fused into the convolution layers, the batch norm layers are deleted, and the structures with continuous convolution layer and batch norm layer are optimized. By using the convolution neural network optimization method, the data normalization process of a batch norm layer is fused into a convolution layer. The network performance may thus be greatly improved without network precision loss. At the same time, the batch norm layer is deleted after the network fusion, which may simplify the network structure and improve the operation speed of network.

As an optional example, if the convolution neural network includes a plurality of batch norm layers, each of batch norm layers is subject to the optimization process above. The normalization process of the plurality of batch norm layers is fused into a convolution layer. Then the plurality of redundant batch norm layers may be deleted, making the network structure clearer as well as greatly improving the network performance.

Figure 5:
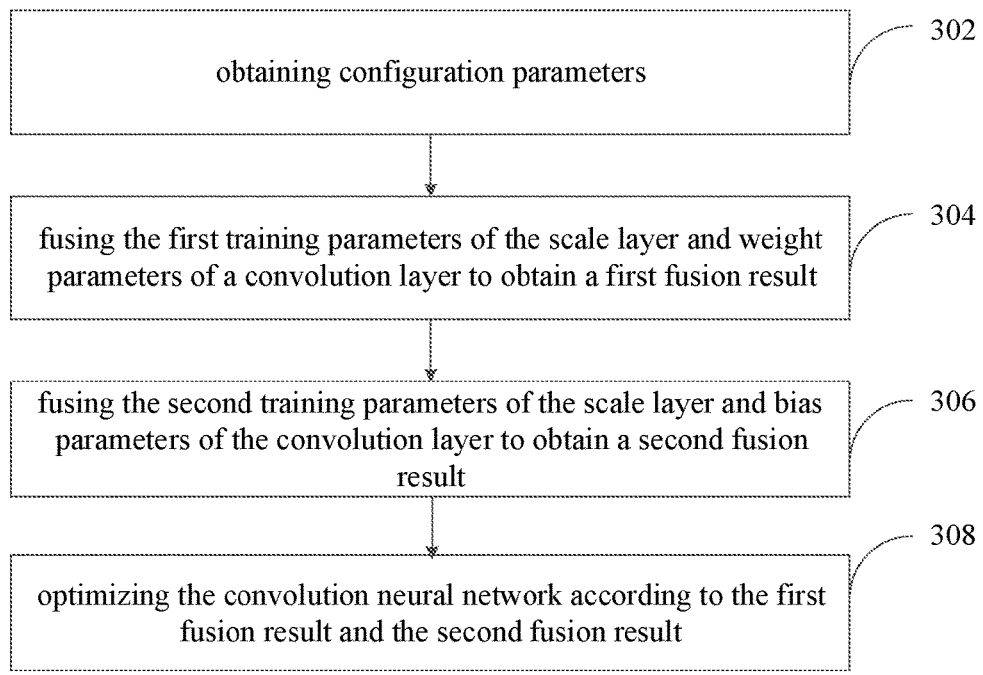
FIG. 5 is a flowchart of an optimization processing method of a convolution neural network of an example of the present disclosure.

Optionally, if the convolution neural network structure includes a structure with two continuous layers including a convolution layer and a scale layer, an example provides an optimization method of the convolution neural network structure. As shown in FIG. 5, the method is applied to the convolution neural network optimization system 100 of FIG. 3. The method includes:

a step 302, obtaining configuration parameters.

The configuration parameters include first training parameters and second training parameters of a scale layer. Specifically, the first training parameters and the second training parameters for performing convolution computations of the scale layer may be obtained from a Caffe model.

The method includes a step 304, fusing the first training parameters of the scale layer and weight parameters of a convolution layer to obtain a first fusion result.

Specifically, the method may include: fusing the first training parameters of the scale layer obtained in the step 302 and the weight parameters of the convolution layer to obtain the first fusion result.

As an optional example, the first training parameters of the scale layer include at least one first training sub-parameter for performing the convolution computations of the scale layer.

Specifically, if the first training parameters of the scale layer include a plurality of first training sub-parameters, the method includes performing fusion computations on all the first training sub-parameters of the scale layer and the weight parameters of the convolution layer.

The method includes a step 306, fusing the second training parameters of the scale layer and bias parameters of the convolution layer to obtain a second fusion result.

Specifically, the method may include: performing fusion computations on the second training parameters of the scale layer obtained in the step 302 and the bias parameters of the convolution layer to obtain the second fusion result.

As an optional example, the second training parameters of the scale layer include at least one second training sub-parameter for performing the convolution computations of the scale layer.

Specifically, if the second training parameters of the scale layer include a plurality of second training sub-parameters, the method includes performing fusion computations on all the second training sub-parameters of the scale layer and the bias parameters of the convolution layer.

The method includes a step 308, optimizing the convolution neural network according to the first fusion result and the second fusion result.

Specifically, the convolution neural network may be optimized according to the first fusion result obtained in the step 304 and the second fusion result obtained in the step 306.

By using the convolution neural network optimization method, the computations of a scale layer are fused into a convolution layer. The network performance may be greatly improved without network precision loss. At the same time, redundant neural network layers are deleted after the network fusion, which may simplify the network structure and improve the operation speed of network.

In an example, the method includes multiplying the first training parameters of the scale layer by the weight parameters of the convolution layer to obtain the first fusion result.

Figure 5A:
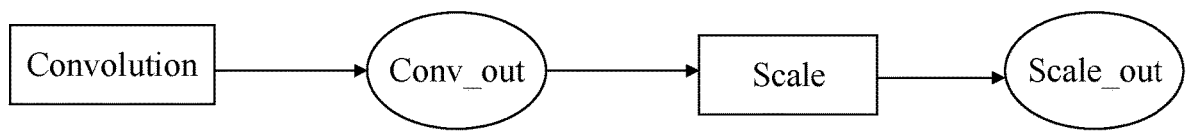
FIG. 5A is a diagram of a structure of a convolution neural network of an example of the present disclosure.

As shown in FIG. 5A, a structure with two continuous layers including a convolution layer and a scale layer may be optimized to a structure with one convolution layer. In other words, computations of the scale layer may be fused into the convolution layer, then the scale layer may be deleted.

The scale layer is used for scaling and translating normalized data, which can be represented as $y=\gamma*x_{norm}+\beta$. $x_{norm}$ denotes normalized input data of the scale layer. $\gamma$ denotes a scale amount. $\beta$ denotes a translation amount.

For instance, formula (2) below is a computation formula of the scale layer.

$$\text{alpha}*x+\text{beta} \qquad (2).$$

Specifically, in order to fuse the computation process of the scale layer into the convolution layer, the first training parameters and the second training parameters for the convolution computations of the scale layer may be obtained. Referring to the formula (2), the first training parameters for performing the convolution computations of the scale layer include a first training sub-parameter (alpha). The second training parameters for performing the convolution computations of the scale layer include a second training sub-parameter (beta).

The first training parameters or the second training parameters (alpha, beta) are vectors. The Caffe model may have more than one first training parameters or the second training parameters of each type. For instance, if the Caffe model has a plurality of first training sub-parameters alpha, then all alpha in the Caffe model may be obtained.

Specifically, still referring to the formula (2), the method includes multiplying the first training sub-parameters (alpha) in the weight parameters by weights of the convolution layer. In other words, alpha in the formula (2) is multiplied by the weights of the convolution layer to obtain the first fusion result alpha *weights.

In an example, the method includes adding the second training parameters of the scale layer and bias parameters of the convolution layer to obtain the second fusion result.

For instance, still referring to the formula (2), the method includes adding the second training sub-parameters (beta) in the second training parameters of the scale layer and the bias of the convolution layer. In other words, beta in the formula (2) is added to the bias of the convolution layer to obtain the second fusion result beta+bias.

In an example, the method includes deleting the scale layer, changing the weight parameters of the convolution layer to the first fusion result, and changing the bias parameters of the convolution layer to the second fusion result.

In a multi-layer neural network, the scale layer is a network structure that is of less importance for model training. For instance, a lightweight convolution neural network Mobile Net has a large number of structures with continuous convolution layers and scale layers. During forward propagation, the scale layers have little to do with the convolution computations, but bring repetition and complexity to the network structure. In this case, after the step 304 and the step 306, the convolution computations of the scale layers are fused into the convolution layers, then the scale layers may be deleted.

Furthermore, the weight parameters of the convolution layers may be changed to the first fusion result obtained in the step 304. Referring to the formula (1), the weight parameters of the convolution layers may be changed to the first fusion result alpha* weights. The bias parameters of the convolution layers may be changed to the second fusion result obtained in the step 306. Referring to the formula (1), the bias parameters of the convolution layers may be changed to the second fusion result −beta+bias. In this way, the normalization performed by the scale layers is fused into the convolution layers, the scale layers are deleted, and the structures with continuous convolution layers and scale layers is optimized.

By using the convolution neural network optimization method, the data normalization process of a scale layer is fused into a convolution layer. The network performance may be greatly improved without network precision loss. At the same time, the scale layer is deleted after the network fusion, which may simplify the network structure and improve the operation speed of network. As an optional example, if the convolution neural network includes a plurality of scale layers, each of scale layers is subject to the optimization process above. The scale and translation process of the plurality of scale layers is fused into the convolution layer. Then the plurality of redundant scale layers may be deleted, making the network structure clearer as well as greatly improving the network performance.

Figure 6:
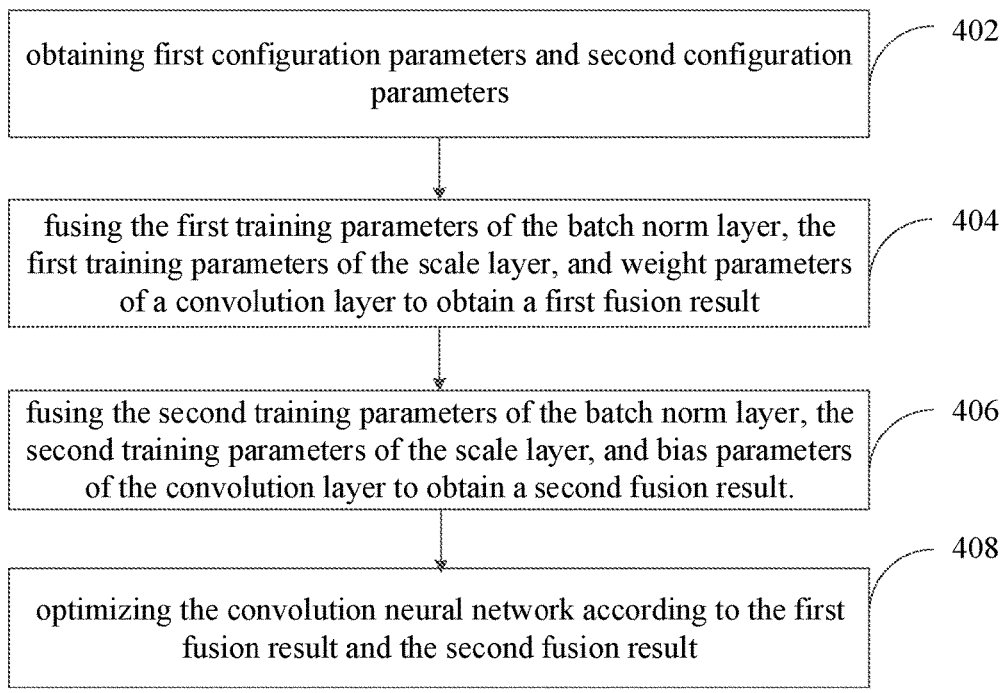
FIG. 6 is a flowchart of an optimization processing method of a convolution neural network of an example of the present disclosure.

Optionally, if the convolution neural network structure includes a structure with three continuous layers including a convolution layer, a batch norm layer, and a scale layer, an example provides an optimization method of the convolution neural network structure. As shown in FIG. 6, the method is applied to the convolution neural network optimization system 100 of FIG. 3. The method includes:

a step 402, obtaining first configuration parameters and second configuration parameters.

The first configuration parameters include first training parameters and second training parameters of a batch norm layer. The second configuration parameters include first training parameters and second training parameters of a scale layer.

Specifically, the first training parameters and the second training parameters for performing convolution computations of the batch norm layer may be obtained from a Caffe model. The first training parameters and the second training parameters for performing convolution computations of the scale layer may also be obtained from the Caffe model.

The method includes a step 404, fusing the first training parameters of the batch norm layer, the first training parameters of the scale layer, and weight parameters of a convolution layer to obtain a first fusion result.

Specifically, the method may include: fusing the first training parameters of the batch norm layer as well as the first training parameters of the scale layer obtained in the step 402 and the weight parameters of the convolution layer to obtain the first fusion result.

As an optional example, the first training parameters of the batch norm layer include at least one first training sub-parameter for performing the convolution computations of the batch norm layer. The first training parameters of the scale layer include at least one first training sub-parameter for performing the convolution computations of the scale layer.

Specifically, if the first training parameters of the batch norm layer include a plurality of first training sub-parameters, the method includes performing fusion computations on all the first training sub-parameters of the batch norm layer and the weight parameters of the convolution layer. If the first training parameters of the scale layer include a plurality of first training sub-parameters, the method includes performing fusion computations on all the first training sub-parameters of the scale layer and the weight parameters of the convolution layer.

The method includes a step 406, fusing the second training parameters of the batch norm layer, the second training parameters of the scale layer, and bias parameters of the convolution layer to obtain a second fusion result.

Specifically, the method may include: fusing the second training parameters of the batch norm layer as well as the second training parameters of the scale layer obtained in the step 402 and the bias parameters of the convolution layer to obtain the second fusion result.

As an optional example, the second training parameters of the batch norm layer include at least one second training sub-parameter for performing the convolution computations of the batch norm layer. The second training parameters of the scale layer include at least one second training sub-parameter for performing the convolution computations of the scale layer.

Specifically, if the second training parameters of the batch norm layer include a plurality of second training sub-parameters, the method includes performing fusion computations on all the second training sub-parameters of the batch norm layer and the bias parameters of the convolution layer. If the second training parameters of the scale layer include a plurality of second training sub-parameters, the method includes performing fusion computations on all the second training sub-parameters of the scale layer and the bias parameters of the convolution layer.

The method includes a step 408, optimizing the convolution neural network according to the first fusion result and the second fusion result.

By using the convolution neural network optimization method, the computations of the batch norm layer and the scale layer are fused into a convolution layer. The network performance may be greatly improved without network precision loss. At the same time, redundant neural network layers are deleted after the network fusion, which may simplify the network structure and improve the operation speed of network.

In an example, the method includes multiplying the first training parameters of the batch norm layer, the first training parameters of the scale layer, and the weight parameters of the convolution layer to obtain the first fusion result.

Figure 6A:
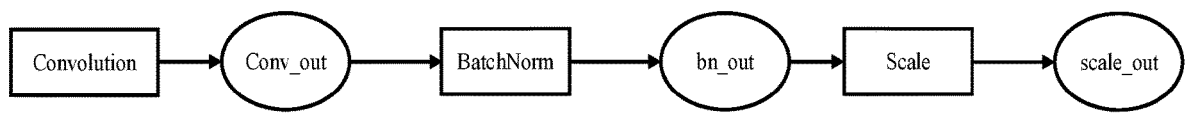
FIG. 6A is a diagram of a structure of a convolution neural network of an example of the present disclosure.

As shown in FIG. 6A, a structure with three continuous layers including a convolution layer, a batch norm layer, and a scale layer may be optimized to a structure with one convolution layer. In other words, computations of the batch norm layer and the scale layer may be fused into the convolution layer, then the batch norm layer and scale layer may be deleted. Although FIG. 6A only shows a positional relationship among the convolution layer, the batch norm layer, and the scale layer, yet the present technical scheme may also be applied to an example where the batch norm layer and the scale layer switch positions.

Specifically, in order to fuse the computation process of the batch norm layer and the scale layer into the convolution layer, the first training parameters and the second training parameters for the convolution computations of the batch norm layer may be obtained, and the first training parameters and the second training parameters for the convolution computations of the scale layer may also be obtained.

For instance, referring to the formula (1) and the formula (2), the process includes multiplying the plurality of first training sub-parameters (alpha,sqrt,var,scale) in the first training parameters of the batch norm layer, the first training sub-parameters (alpha) in the first training parameters of the scale layer, and the weights of the convolution layer. In other words, the data part $$\frac{alpha}{sqrt(var*scale)}$$

in the formula (1), alpha in the formula (2), and the weights of the convolution layer are multiplied to obtain the first fusion result $$\frac{alpha}{sqrt(var*scale)}*alpha*weights.$$

In an example, the method includes adding the second training parameters of the batch norm layer, the second training parameters of the scale layer, and bias parameters of the convolution layer to obtain the second fusion result.

For instance, still referring to the formula (1), the method includes adding the plurality of second training sub-parameters (alpha,mean,var,scale,beta) in the second training parameters of the batch norm layer, the second training sub-parameters (beta) in the second training parameters of the scale layer, and the bias of the convolution layer. In other words, the data part $$-alpha*mean*sqrt\left(\frac{scale}{var}\right)+beta$$

in the formula (1), beta in the formula (2), and the bias of the convolution layer are added to obtain the second fusion result $$-alpha*mean*sqrt\left(\frac{scale}{var}\right)+beta+beta+bias.$$

In an example, the method includes deleting the batch norm layer and the scale layer, changing the weight parameters of the convolution layer to the first fusion result, and changing the bias parameters of the convolution layer to the second fusion result.

In a multi-layer neural network, the batch norm layer and the scale layer are network structures that are of less importance for model training. For instance, a lightweight convolution neural network Mobile Net has a large number of structures with continuous convolution layer, batch norm layer, and scale layer. During forward propagation, the scale layers and the batch norm layers have little to do with the convolution computations, but bring repetition and complexity to the network structure. In this case, after the step 404 and the step 406, the convolution computations of the batch norm layers and the scale layers are fused into the convolution layers, then the batch norm layers and the scale layers may be deleted.

Furthermore, the weight parameters of the convolution layers may be changed to the first fusion result obtained in the step 404. Referring to the formula (1), the weight parameters of the convolution layers may be changed to the first fusion result $$\frac{alpha}{sqrt(var*scale)}*alpha*weights.$$

The bias parameters of the convolution layers may be changed to the second fusion result obtained in the step 406. Still referring to the formula (1), the bias parameters of the convolution layers may be changed to the second fusion result $$-alpha*mean*sqrt\left(\frac{scale}{var}\right)+beta+beta+bias.$$

In this way, the normalization performed by the batch norm layers and the scale layers is fused into the convolution layers, then the batch norm layers and the scale layers may be deleted to finish optimizing the structures with continuous convolution layer, batch norm layer, and scale layer.

By using the convolution neural network optimization method, the data normalization process of a batch norm layer and a scale layer is fused into a convolution layer. The network performance may thus be greatly improved without network precision loss. At the same time, the batch norm layer and the scale layer are deleted after the network fusion, which may simplify the network structure and improve the operation speed of network.

Figure 7:
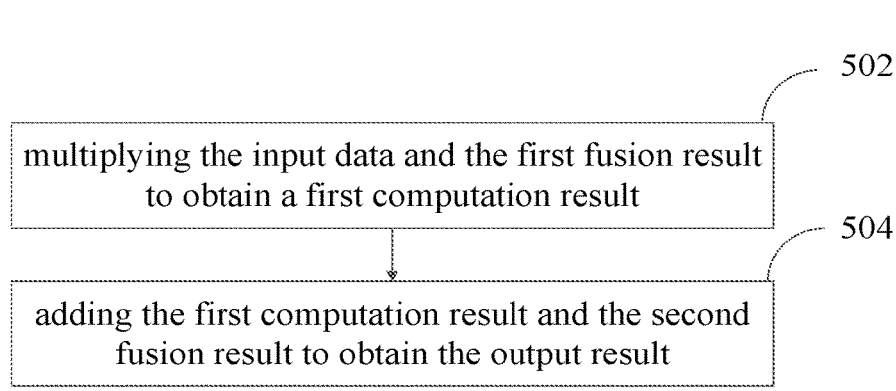
FIG. 7 is a flowchart of an optimization processing method of a convolution neural network of an example of the present disclosure.

Based on the examples above, the present disclosure further provides a convolution neural network optimization method. The method may be used on the convolution neural network optimization system shown in FIG. 3. The method includes performing convolution computations on input data of the convolution layers and the first fusion result, performing convolution computations on the input data of the convolution layers and the second fusion result, so as to obtain output results of the convolution layers. As shown in FIG. 7, the method includes:

a step 502, multiplying the input data and the first fusion result to obtain a first computation result.

Referring to FIG. 4, an optional example provides an optimization method of fusing a batch norm layer to a convolution layer for a two-layer convolution neural network. According to the formula (1), input data x of the convolution layer is multiplied by the first fusion result $$\frac{alpha}{sqrt(var*scale)}*weights$$

to obtain the first computation result $$x*\frac{alpha}{sqrt(var*scale)}*weights.$$

Referring to FIG. 5, an optional example provides an optimization method of fusing a scale layer to a convolution layer for a two-layer convolution neural network. According to the formula (2), input data x of the convolution layer is multiplied by the first fusion result alpha*weights to obtain the first computation result x*alpha*weights.

Referring to FIG. 6, an optional example provides an optimization method of fusing a batch norm layer and a scale layer to a convolution layer for a three-layer convolution neural network. According to the formula (1) and the formula (2), input data x of the convolution layer is multiplied by the first fusion $$\frac{alpha}{sqrt(var*scale)}*alpha*weights$$

to obtain the first computation result $$x*\frac{alpha}{sqrt(var*scale)}*alpha*weights.$$

The method includes: a step 504, adding the first computation result and the second fusion result to obtain the output result.

Referring to FIG. 4, regarding an optional example of the optimization method of fusing a batch norm layer to a convolution layer for a two-layer convolution neural network, a second fusion result is $$-alpha*mean*sqrt\left(\frac{scale}{var}\right)+beta+bias,$$

according to the formula (1). The first computation result $$x*\frac{alpha}{sqrt(var*scale)}*weights$$

is added to the second fusion result $$-alpha*mean*sqrt\left(\frac{scale}{var}\right)+beta+bias$$

to obtain the output result, which is $$x*\frac{alpha}{sqrt(var*scale)}*weights-alpha*mean*sqrt\left(\frac{scale}{var}\right)+beta+bias.$$

Referring to FIG. 5, regarding an optional example of the optimization method of fusing a scale layer to a convolution layer for a two-layer convolution neural network, a second fusion result is beta+bias according to the formula (2). The first computation result x*alpha*weights is added to the second fusion result beta+bias to obtain the output result, which is x*alpha*weights+beta+bias.

Referring to FIG. 6, regarding an optional example of the optimization method of fusing a batch norm layer and a scale layer to a convolution layer for a three-layer convolution neural network, a second fusion result is $$-alpha*mean*sqrt\left(\frac{scale}{var}\right)+beta+beta+bias$$

according to the formula (1) and the formula (2). The first computation result $$x * \frac{alpha}{sqrt(var*scale)} * alpha * weights$$

is added to the second fusion result $$-alpha * mean * sqrt\left(\frac{scale}{var}\right) + beta + beta + bias$$

to obtain the output result, which is $$x * \frac{alpha}{sqrt(var*scale)} * alpha * weights - alpha * mean * sqrt\left(\frac{scale}{var}\right) + beta + beta + bias.$$

When the above-mentioned convolution neural network optimization methods are adopted, input data of a convolution layer is subject to convolution computations with the first fusion result and the second fusion result respectively. The methods may ensure that computations do not overflow and there is no precision loss after a network is optimized, thereby improving the network operation speed.

Figure 3:
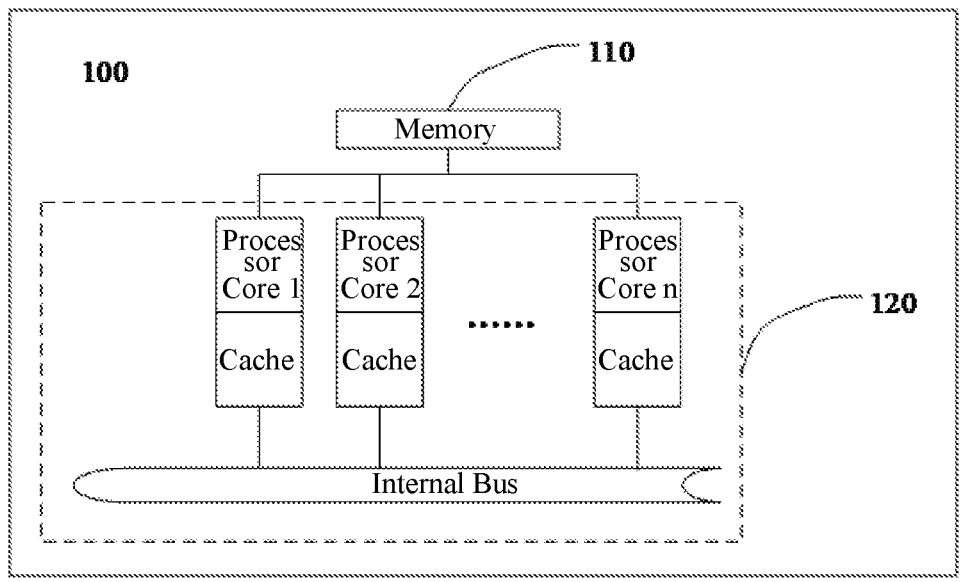
FIG. 3 is a diagram of a convolution neural network optimization system of an example of the present disclosure.
Figure 8:
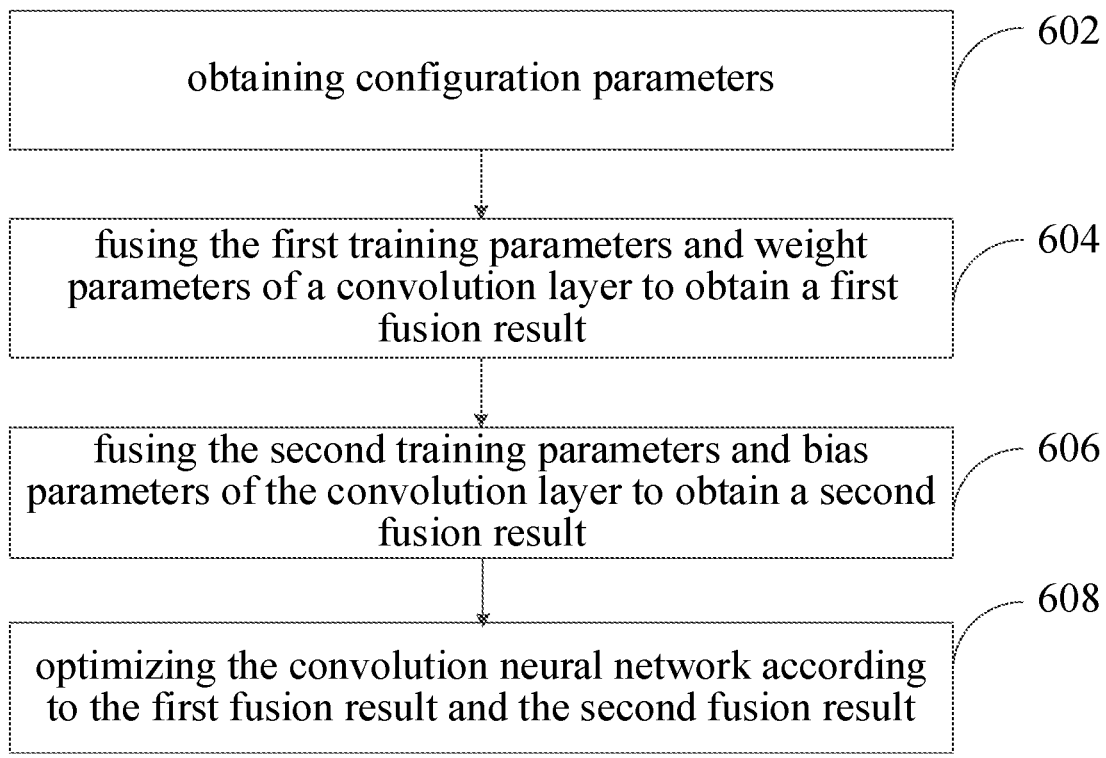
FIG. 8 is a flowchart of an optimization processing method of a convolution neural network of an example of the present disclosure.

Optionally, as shown in FIG. 8, the present disclosure further provides a convolution neural network optimization method that may be used on the convolution neural network optimization system of FIG. 3. The method includes:

a step 602, obtaining configuration parameters.

The configuration parameters include first training parameters and second training parameters. The first training parameters include one or a plurality of first training sub-parameters. The second training parameters include one or a plurality of second training sub-parameters.

The method includes a step 604, fusing the first training parameters and weight parameters of a convolution layer to obtain a first fusion result.

Specifically, the method may include: fusing the first training parameters obtained in the step 602 and the weight parameters of the convolution layer to obtain the first fusion result.

In an example, the method may include multiplying the first training parameters by the weight parameters of the convolution layer to obtain the first fusion result.

Specifically, if the first training parameters include a plurality of first training sub-parameters, the method includes multiplying all the first training sub-parameters by the weight parameters of the convolution layer.

The method includes a step 606, fusing the second training parameters and bias parameters of the convolution layer to obtain a second fusion result.

Specifically, the method may include: fusing the second training parameters obtained in the step 602 and the bias parameters of the convolution layer to obtain the second fusion result.

In an example, the method may include adding the second training parameters and the bias parameters of the convolution layer to obtain the second fusion result.

Specifically, if the second training parameters include a plurality of second training sub-parameters, the method includes adding all the second training sub-parameters and the bias parameters of the convolution layer.

The method includes a step 608, optimizing the convolution neural network according to the first fusion result and the second fusion result.

Specifically, the convolution neural network may be optimized according to the first fusion result obtained in the step 604 and the second fusion result obtained in the step 606.

In an example, the method includes deleting a redundant layer of the neural network, changing the weight parameters of the convolution layer to the first fusion result, and changing the bias parameters of the convolution layer to the second fusion result.

The redundant layer refers to a network structure that is deployed in a multi-layer neural network, but is of less importance for model inference. For instance, a lightweight convolution neural network Mobile Net has a large number of structures with continuous convolution layer, batch norm layer, and scale layer. During forward propagation, the scale layers and the batch norm layers have little to do with the convolution computations, but bring repetition and complexity to the network structure. In this case, the batch norm layers and the scale layers may be regarded as redundant layers. However, redundant neural network layers are not limited to the batch norm layers and the scale layers.

Furthermore, the weight parameters of the convolution layers may be changed to the first fusion result obtained in the step 604. The bias parameters of the convolution layers may be changed to the second fusion result obtained in the step 606. In this way, the data processing performed by the redundant layers is fused into the convolution layers, the redundant layers are then deleted, and the structure optimization of the convolution layers and the redundant layers is completed.

By using the convolution neural network optimization method, the computations of redundant neural network layer are fused into a convolution layer. The network performance may be greatly improved without network precision loss. At the same time, redundant neural network layers are deleted after the network fusion, which may simplify the network structure and improve the operation speed of network.

In Mobile Net, a new network parameter such as opt_level may be added to a Caffe source code file filecaffe.proto for indicating the network optimization level. By setting a value of the parameter, a network structure of a convolution neural network can be automatically detected. According to the parameter value, a corresponding convolution neural network optimization method can be automatically called, which may help reduce learning costs for users and retain users' right to choose while improving ease of use With the network structure processing method and the network structure optimization processing method, a computer equipment may optimize a network structure once or twice according to a second optimization level. In the two times of optimization, the first optimization is to optimize the structure of the network structure, reduce the complexity of the network structure, and improve the detection rate of the network; the second optimization is to optimize the model parameters of the network structure to obtain an optimal network model, which may further improve the detection precision of the network. Note that it is the type of structure included in the network structure that determines whether the computer equipment perform optimization once or twice. The type of structure may be the three types as mentioned in the examples above, and is thus not explained in detail here.

In addition, the optimization level mentioned in all the examples above may include multiple types. Each type of optimization level corresponds to different optimization method. By adopting the setting of optimization level, the network structure processing method provided by the present disclosure allows users to set different optimization level according to their demands so that the optimization of network structure can be completed.

Figure 9:
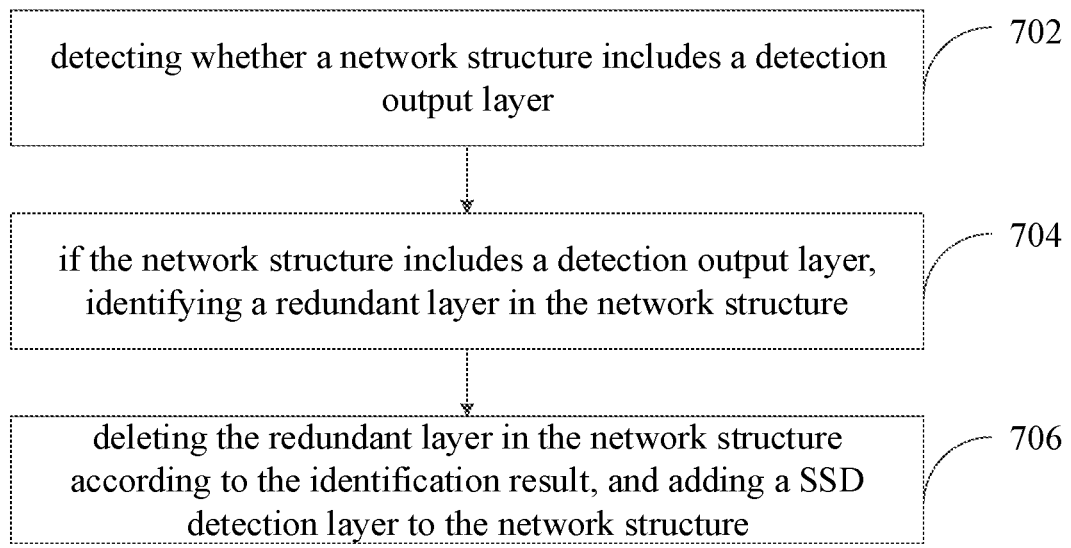
FIG. 9 is a flowchart of a network structure processing method of an example of the present disclosure.

FIG. 9 is a flowchart of a network structure processing method of an example of the present disclosure. The example relates to a process of deleting a redundant layer of a network structure by a computer equipment. As shown in FIG. 9, the method includes:

a step 702, detecting whether a network structure includes a detection output layer.

The detection output layer is a structure layer for outputting a detection result in a network structure.

In the present example, when the computer equipment performs deletion processing on the network structure, the computer equipment may first search a detection output layer in the network structure. If a detection output layer exits in the network structure, the network structure has a redundant layer and needs to be subject to deletion processing. If a detection output layer does not exist in the network structure, the network structure does not have any redundant layer and does not need to be subject to deletion processing. Therefore, based on the description above, every time when the computer equipment optimizes the network structure, the computer equipment may first determine whether the network structure includes a detection output layer so as to determine whether to perform the operation of deleting the redundant layer. It should be noted that the above-mentioned detection output layer is a common structure layer in a network structure and is only used for outputting a detection result of the network structure.

The method includes a step 704, if the network structure includes a detection output layer, identifying a redundant layer in the network structure.

In the present example, when the network structure includes a detection output layer, the computer equipment may perform further deletion processing on the redundant layer of the network structure. Specifically, the computer equipment may first check redundant layers to be deleted which are predefined by users. According to types of those redundant layers or identifiers of those redundant layers, the computer equipment may search a structure layer that is consistent with the types of those redundant layers or the identifiers of those redundant layers, so that the computer equipment can identify redundant layers to be deleted.

The method includes a step 706, deleting the redundant layer in the network structure according to the identification result, and adding an SSD detection layer to the network structure. The SSD detection layer is for configuring a default box, splicing feature maps, and outputting a detection result.

The SSD detection layer is a structure layer for outputting an output detection result in a network structure. The SSD detection layer may have a function of another redundant layer based on certain needs and is different from the detection output layer mentioned in the step 702.

In the present example, after the computer equipment identifies the redundant layer in the network structure, the computer equipment may delete the redundant layer directly, readjust the network structure to obtain a new network structure, then add the SSD detection layer for outputting an detection result to the new network structure to obtain a first optimized network structure. It should be noted that in order to ensure the first optimized network structure has the same function and detection precision as the original and unoptimized network structure does, the SSD detection layer added to the network structure can not only output a detection result but also fulfill a function of a deleted redundant layer. For instance, the SSD detection layer can fulfill a function of generating a default box in an image according to image feature information, a function of splicing a plurality of feature maps, and the like.

In the example above, a SSD detection layer is added to a network structure to fulfill a function of a deleted redundant layer. Therefore, while keeping a function of a network structure the same, the network structure processing method provided by the present disclosure realizes deletion processing on the network structure and simplifies the network structure. In this way, the network structure may occupy fewer system resources, thereby improving the detection rate of the network structure.

Figure 10:
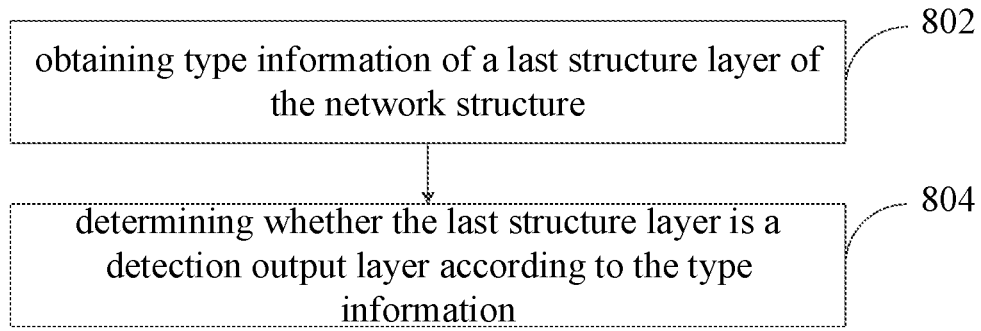
FIG. 10 is a flowchart of an implementation of the step 702 in the example of FIG. 9.

FIG. 10 is a flowchart of an implementation of the step 702. The example relates to a process of searching a detection output layer of a network structure by a computer equipment. As shown in FIG. 10, the step 702, detecting whether the network structure includes a detection output layer includes:

a step 802, obtaining type information of a last structure layer of the network structure.

The type information is for distinguishing different structure layers in the network structure, which may be denoted by numbers, letters, codes, and the like. The type information may be predefined by users and stored in a corresponding database for later use.

In certain applications, in order to distinguish a type of each structure layer in the network structure, users may predefine the type information of each structure layer in the network structure. Since a detection output layer is often a last layer of a network structure, when the computer equipment determines whether the network structure includes a detection output layer, the computer equipment may only need to determine whether the last structure layer of the network structure is a detection output layer. A method for determining whether the last structure layer of the network structure is a detection output layer may be: obtaining, by the computer equipment, the type information of the last structure layer of the network structure, and then determining whether the last structure layer of the network structure is a detection output layer according to the type information.

The step 702 further includes: a step 804, determining whether the last structure layer is a detection output layer according to the type information.

After the computer equipment obtains the type information of the last structure layer of the network structure, the computer equipment may compare the type information with type information of a detection output layer. If the two are consistent, then the last structure layer is a detection output layer. If the two are inconsistent, then the last structure layer is not a detection output layer.

Figure 11:
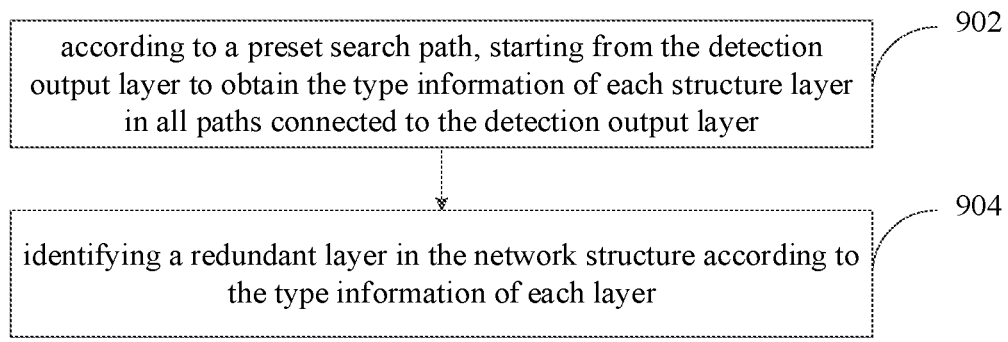
FIG. 11 is a flowchart of an implementation of the step 704 in the example of FIG. 9.

FIG. 11 is a flowchart of an implementation of the step 704 in FIG. 9. The example relates to a process of identifying a redundant layer of a network structure by a computer equipment. As shown in FIG. 11, the step 704 identifying a redundant layer in the network structure includes:

a step 902, according to a preset search path, starting from the detection output layer to obtain the type information of each structure layer in all paths connected to the detection output layer.

The search path is a path where the computer equipment searches a certain target structure layer in the network structure, and may be predefined according to connections between structure layers of the network structure.

When the computer equipment identifies a redundant layer in the network structure, the computer equipment may first determine a position of the detection output layer in the network structure, then start from the position to search all structure layers along the preset search path as well as obtain the type information of the structure layers. It should be noted that the network structure may include a plurality of paths connected to the detection output layer. If the network structure includes a plurality of paths connected to the detection output layer, after the computer equipment finishes identifying all structure layers along one preset search path, the computer equipment may continue to identify all structure layers along another search path connected to the detection output layer according to an order of search until all structure layers along a last path connected to the detection output layer are subject to identifying.

The step 704 further includes a step 904, identifying a redundant layer in the network structure according to the type information of each layer.

After the computer equipment obtains the type information of all the structure layers of the network structure, the computer equipment may compare and analyze the type information of the structure layers with the type information of redundant layers in a one-to-one correspondence. If the type information of a structure layer is consistent with the type information of a redundant layer, the structure layer is a redundant layer.

Figure 12:
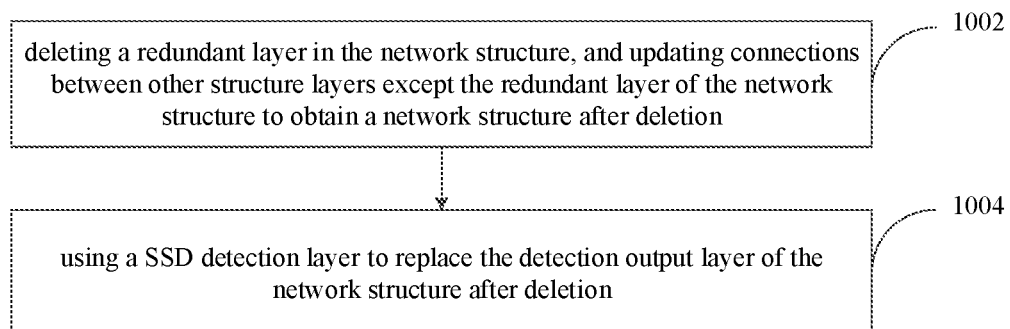
FIG. 12 is a flowchart of a network structure processing method of an example of the present disclosure.

FIG. 12 is a flowchart of a network structure processing method of an example of the present disclosure. The example relates to a process of deleting a redundant layer of a network structure by a computer equipment. As shown in FIG. 12, the method includes:

a step 1002, deleting a redundant layer in the network structure, and updating connections between other structure layers except the redundant layer of the network structure to obtain a network structure after deletion.

After the computer equipment determines the redundant layer in the network structure, the computer equipment may delete the redundant layer directly. Specifically, the computer equipment may break connections between the redundant layer and other structure layers of the network structure, readjust the connections between other structure layers of the network structure after the redundant layer is deleted, and update the network structure to obtain a network structure after deletion.

The method further includes a step 1004, using a SSD detection layer to replace the detection output layer of the network structure after deletion.

After the computer equipment deletes the redundant layer in the network structure and obtains the network structure after deletion, the computer equipment may continue to search a detection output layer, and delete the detection output layer from the network structure after deletion. At the same time, the computer equipment may add an SSD detection layer to a position where the detection output layer was in, which is for replacing the deleted detection output layer to realize a function of outputting a detection result, as well as realize a function of the deleted redundant layer. After the computer equipment adds an SSD detection layer to the network structure, the computer equipment may readjust connections between the SSD detection layer and other structure layers in the network structure to obtain a first optimized network structure.

Optionally, redundant layers of a network structure may include a default box configuration layer, a splicing layer, a permute layer, and a flatten layer.

The default box configuration layer has a function of deploying a default box at each pixel in a feature map. The splicing layer has a function of splicing more than two feature maps. The permute layer has a function of permuting an order of an index axis. The flatten layer has a function of flattening a parameter dimension.

Figure 13:
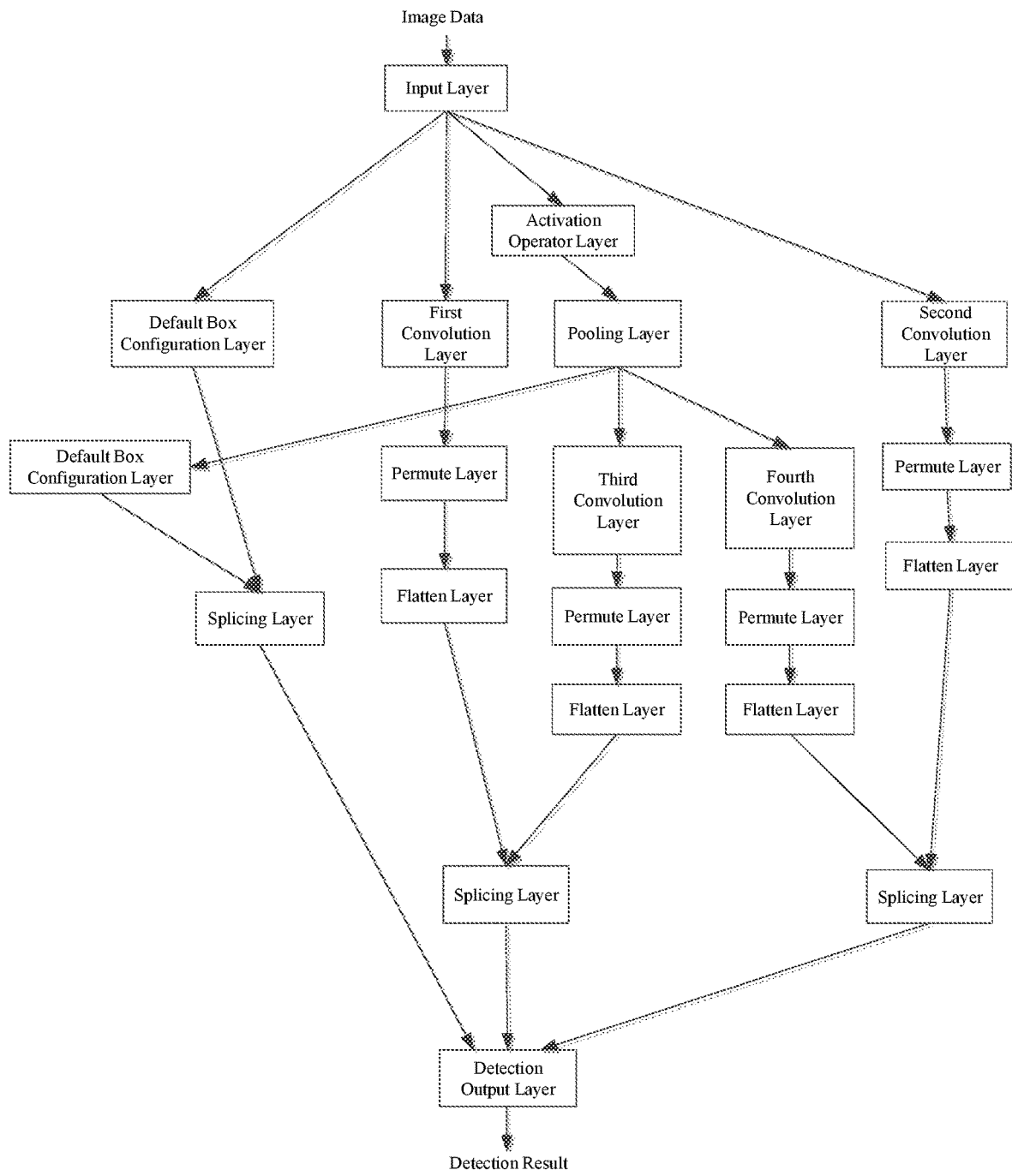
FIG. 13 is a diagram of a network structure before optimization of an example of the present disclosure.

Referring to FIG. 13, the network structure is a network structure before optimization. Redundant layers of the network structure include: a default box configuration layer and a splicing layer between an input layer and a detection output layer; a default box configuration layer and the splicing layer between a pooling layer and the detection output layer; a permute layer, a flatten layer, and a splicing layer between a first convolution layer and the detection output layer; a permute layer, a flatten layer, and a splicing layer between a second convolution layer and the detection output layer; a permute layer, a flatten layer, and the splicing layer between a third convolution layer and the detection output layer; and a permute layer, a flatten layer, and the splicing layer between a fourth convolution layer and the detection output layer.

Figure 14:
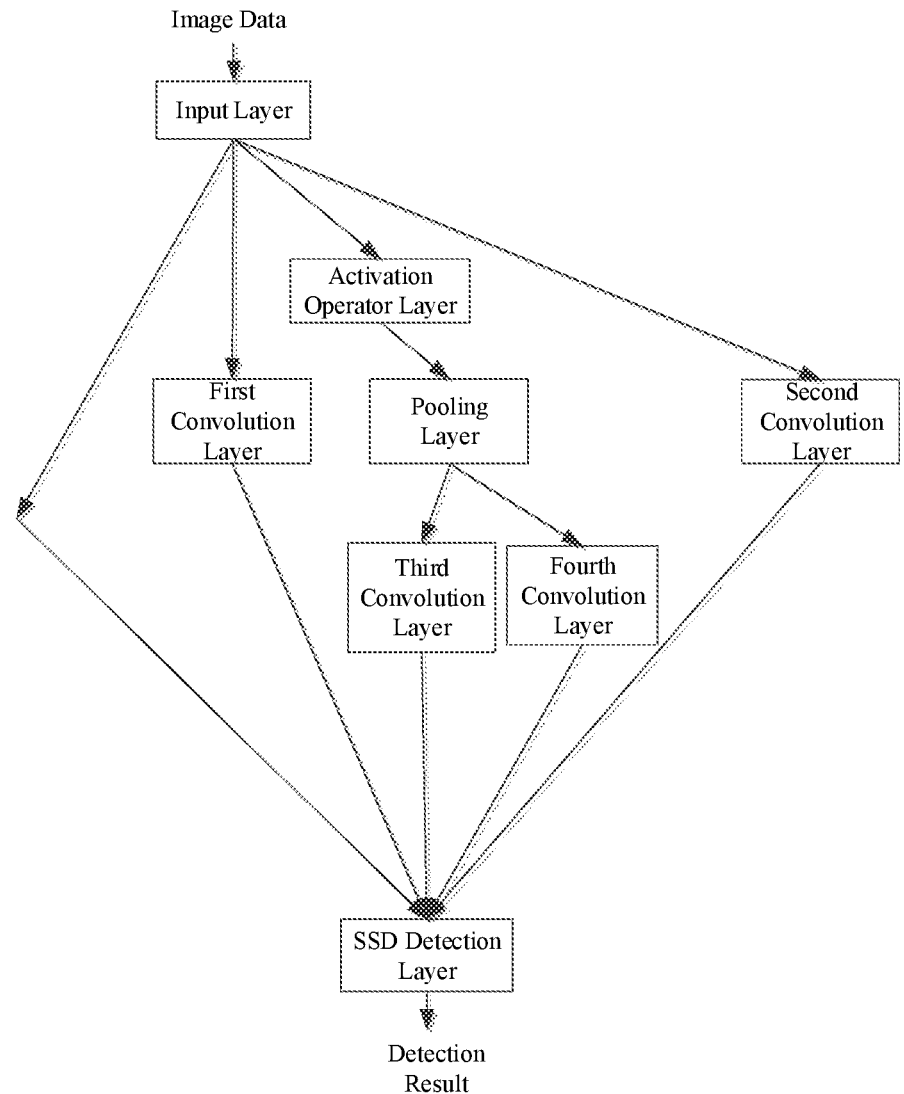
FIG. 14 is a diagram of a network structure after optimization of an example of the present disclosure.

Optionally, as shown in FIG. 14, the first optimized network structure may include an input layer, an activation operator layer, a first convolution layer, a second convolution layer, a pooling layer, a third convolution layer, a fourth convolution layer, and an SSD detection layer.

An output end of the input layer is connected to input ends of the activation operator layer, the first convolution layer, the second convolution layer, and the SSD detection layer respectively. An output end of the activation operator layer is connected to an input end of the pooling layer. An output end of the pooling layer is connected to input ends of the third convolution layer and the fourth convolution layer respectively. Output ends of the first convolution layer, the second convolution layer, the third convolution layer, and the fourth convolution layer are connected to the input end of the SSD layer respectively.

The input layer is used for receiving image data and extracting feature information from of the image from the image data. The activation operator layer is used for converting linear feature information into non-linear feature information. The first convolution layer is used for computing a confidence of a feature map according to received feature information. The second convolution layer is for computing position information of a feature map according to received feature information. The pooling layer is used for compressing feature information and extracting main feature information. The third convolution layer is used for obtaining a confidence of a main feature map according to received main feature information. The fourth convolution layer is used for obtaining a position of a main feature map according to received main feature information.

Optionally, after the computer equipment deletes the redundant layers of the network structure of FIG. 13 and adds the SSD detection layer, the first optimized network structure shown in FIG. 14 may be obtained. A workflow of the first optimized network structure is as follows: receiving, by the input layer, image data to be detected, extracting feature information from the image data, and transferring the feature information to the activation operator layer, the first convolution layer, the second convolution layer, and the SSD detection layer which are connected to the input layer for data processing; after the activation operator layer receives the feature information, converting, by the activation operator layer, the feature information into nonlinear feature information, and inputting the nonlinear feature information to the pooling layer connected to the activation operator layer; extracting, by the pooling layer, main feature information from the nonlinear feature information, transferring the main feature information to the third convolution layer and the fourth convolution layer that are connected to the pooling layer; computing, by the third convolution layer, a confidence of a feature map according to the received main feature information, and transferring the confidence to the SSD detection layer for outputting; computing, by the fourth convolution layer, position information of the main feature map according to the received main feature information, and transferring the position information to the SSD detection layer for outputting; after the first convolution layer receives the feature information, computing, by the first convolution layer, a confidence of the feature map according to the feature information, and transferring the confidence to the SSD detection layer for outputting; after the second convolution layer receives the feature information, computing, by the second convolution layer, position information of the feature map according to the feature information, and transferring the position information to the SSD detection layer for outputting; and splicing, by the SSD detection layer, the data output by the input layer, the data output by the first convolution layer, the data output by the second convolution layer, the data output by the third convolution layer, and the data output by the fourth convolution layer to obtain a final output detection result which includes the confidence and the position of the feature map.

From the comparison between the network structure of FIG. 13 and the first optimized network structure of FIG. 14, it can be seen that the first optimized network structure obtained by using the network structure processing method provided by the present disclosure has fewer structure layers, which requires less hardware resource overhead, and thereby may improve the detection rate of the network structure.

It should be understood that though the steps in the flowcharts of FIGS. 2-12 are shown according to the direction indicated by arrows, yet these steps may not necessarily be performed in the order indicated by the arrows. Unless clearly stated herein, the order for performing these steps is not strictly restricted. These steps may be performed in a different order. Additionally, at least part of the steps shown in FIGS. 2-12 may include a plurality of sub-steps or a plurality of phases. These sub-steps or phases may not necessarily be performed and completed at the same time, instead, these sub-steps or phases may be performed at different time. These sub-steps or phases may not necessarily be performed sequentially either.

Figure 15:
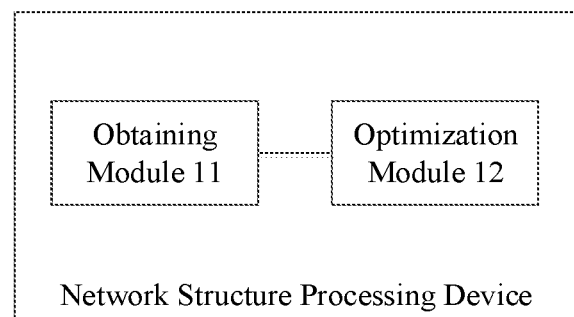
FIG. 15 is a structural diagram of a network structure processing device of an example of the present disclosure.

An example as shown in FIG. 15 provides a network structure processing device including: an obtaining module 11 and an optimization module 12.

The obtaining module 11 is configured to obtain an optimization instruction. The optimization module 12 is configured to optimize a network structure according to an optimization level in the optimization instruction.

The implementation principles and technical effects of the network structure processing device provided in the present example are similar to those of the method provided in the foregoing example, thus are omitted here.

An example of the present disclosure provides a machine learning chip including the network structure processing device.

An example of the present disclosure further provides a chip package structure including the chip.

Figure 16:
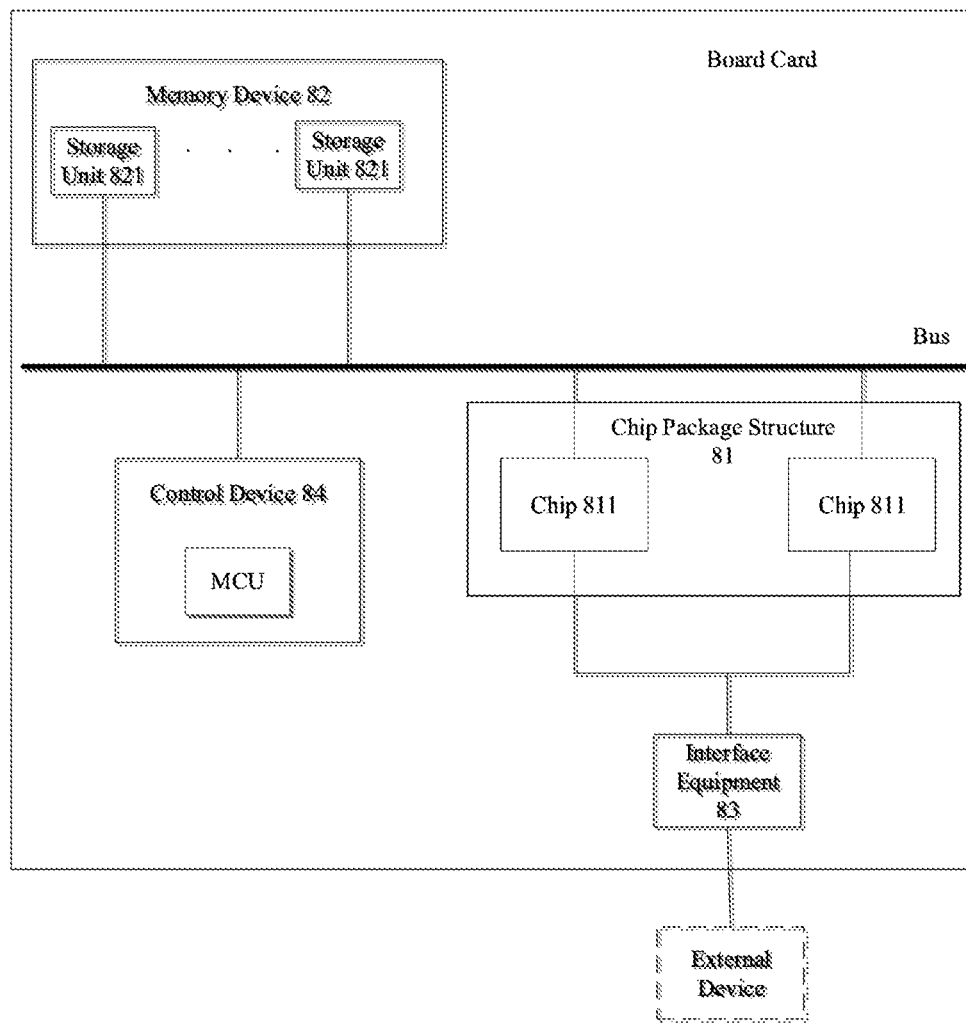
FIG. 16 is a diagram of a board card of an example of the present disclosure.

An example of the present disclosure provides a board card including the chip package structure. Referring to FIG. 16, in addition to the chip package structure 81, the board card may further include other matching components which include, but not limited to, a memory device 82, an interface equipment 83, and a control device 84. The memory device 82 is connected to the machine learning chip 811 inside the chip package structure 81 via a bus, which is configured to store data. The memory device 82 may include a plurality of groups of storage units 821. Each group of storage units 821 is connected to the machine learning chip 811 via the bus. It can be understood that each group of storage units 821 may be DDR SDRAM (Double Data Rate SDRAM).

DDR can double the speed of SDRAM without increasing the clock frequency. DDR allows data to be read on the rising and falling edges of the clock pulse. The speed of DDR is twice the speed of standard SDRAM. In an example, the memory device may include 4 groups of storage units. Each group of storage units may include a plurality of DDR4 particles (chips). In an example, the chip may include four 72-bit DDR4 controllers. 64 bits of each 72-bit DDR4 controller are for data transfer and 8 bits are for ECC parity. In an example, each group of storage units includes a plurality of DDR SDRAMs (Double Data Rate Synchronous Dynamic Random Access Memory) set in parallel. DDR can transfer data twice per clock cycle. The DDR controllers are set inside the chip for controlling the data transfer and data storage of each storage unit.

The interface equipment 83 is electrically connected to the machine learning chip 811 inside the chip package structure 81. The interface equipment 83 is configured to transfer data between the machine learning chip 811 and an external device (such as a server or a computer). For instance, the interface equipment 83 may be a standard PCIe (peripheral component interconnect express) interface. Data transfer may be realized in a way that a server transfers data to be processed to the machine learning chip via the PCIe interface. Optionally, when a PCIe 3.0×16 interface is adopted for transferring, the theoretical bandwidth may reach 16000 MB/s. In another example, the interface equipment 83 may also be another interface. The present disclosure does not restrict a specific form of another interface as long as the interface equipment can realize the transferring function. In addition, a computation result of the machine learning chip may still be transferred by the interface equipment 83 to an external device (such as a server).

The control device 84 is electrically connected to the machine learning chip 811, and is configured to monitor the status of the chip. Specifically, the machine learning chip 811 and the control device 84 may be electrically connected through a SPI (Serial Peripheral Interface) interface. The control device may include a MCU (Micro Controller Unit). If the machine learning chip includes a plurality of data processing devices and/or a plurality of combined processing devices, the chip is capable of driving a plurality of loads. In this case, the machine learning chip may be in different working status such as multi-load status and light-load status. The working status of the plurality of data processing chips and/or the plurality of combined processing devices may be regulated by the control device 84.

Examples of the present disclosure provide an electronic device including the board card. The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment. The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

Those skilled in the art should also understand that the examples described in the specification are all optional, and the actions and modules involved are not necessarily required for this disclosure. In the examples above, the description of each example has its own emphasis. For a part that is not described in detail in one example, reference may be made to related descriptions in other examples.

In the several examples provided in this disclosure, it should be understood that the disclosed device may be implemented in other ways. For instance, the examples above are merely illustrative. For instance, the division of the units is only a logical function division. In a real implementation, there may be another manner for division. For instance, a plurality of units or components may be combined or may be integrated in another system, or some features can be ignored or not performed. In addition, the displayed or discussed mutual coupling or direct coupling or communication connection may be implemented through indirect coupling or communication connection of some interfaces, devices or units, and may be electrical or other forms.

The units described as separate components may or may not be physically separated. The components shown as units may or may not be physical units. In other words, the components may be located in one place, or may be distributed to a plurality of network units. According to certain needs, some or all of the units can be selected for realizing the purposes of the examples of the present disclosure.

In addition, the functional units in each example of the present application may be integrated into one processing unit, or each of the units may exist separately and physically, or two or more units may be integrated into one unit. The integrated units above may be implemented in the form of hardware or in the form of software program modules.

When the integrated units are implemented in the form of a software program module and sold or used as an independent product, they may be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer device (which may be a personal computer, a server, or a network device, etc.) to perform all or part of the steps of the methods described in the examples of the present disclosure. The foregoing memory includes: a USB flash drive, a read-only memory (ROM), a random access memory (RAM), a mobile hard disk, a magnetic disk, or an optical disc, and other media that can store program codes.

A person of ordinary skill in the art may understand that all or part of the processing procedures of the foregoing examples may be completed by a program instructing related hardware. The program may be stored in a computer-readable memory, and the memory may include a flash disk, a read-only memory (ROM), a random access memory (RAM), a magnetic disk, an optical disk, or the like.

The examples of the present disclosure have been described in detail above. Specific examples have been used in the specification to explain the principles and implementation manners of the present disclosure. The descriptions of the above examples are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

The invention claimed is:

1. A network structure processing method comprising:
    obtaining an optimization instruction; and
    optimizing a network structure according to an optimization level in the optimization instruction,
    wherein optimizing the network structure according to the optimization level in the optimization instruction includes:
    when the optimization level is a second optimization level, and when the network structure does not include any of the following network structures: a structure with two continuous layers including a convolution layer and a batch norm layer, a structure with two continuous layers including a convolution layer and a scale layer, and a structure with three continuous layers including a convolution layer, a batch norm layer, and a scale layer, deleting a redundant layer in the network structure to obtain a first optimized network structure.

2. The method of claim 1, wherein optimizing the network structure according to the optimization level in the optimization instruction includes:
    when the optimization level is a first optimization level, deleting a redundant layer in the network structure to obtain a first optimized network structure.

3. The method of claim 2, wherein deleting the redundant layer in the network structure includes:
    determining whether the network structure includes a detection output layer,
    when the network structure includes a detection output layer, identifying the redundant layer in the network structure, and
    deleting the redundant layer in the network structure according to the identification result and adding an SSD detection layer to the network structure, wherein the SSD detection layer is used for configuring a default box, splicing feature maps, and outputting a detection result.

4. The method of claim 3, wherein determining whether the network structure includes a detection output layer includes:
    obtaining type information of a last structure layer of the network structure, and
    determining whether the last structure layer is the detection output layer according to the type information.

5. The method of claim 3, wherein identifying the redundant layer in the network structure includes:
    according to a preset search path, starting from the detection output layer to obtain type information of each structure layer in all paths connected to the detection output layer, and
    identifying the redundant layer in the network structure according to the type information of each layer.

6. The method of claim 3, wherein deleting the redundant layer in the network structure further includes:
    deleting the redundant layer in the network structure, and updating connections between other structure layers except the redundant layer of the network structure to obtain a network structure after deletion, and using the SSD detection layer to replace the detection output layer of the network structure after deletion.

7. The method of claim 2, wherein the redundant layer includes: a default box configuration layer, a splicing layer, a permute layer, and a flatten layer.

8. The method of claim 1, wherein optimizing the network structure according to the optimization level in the optimization instruction includes:

when the optimization level is a second optimization level, and when the network structure includes at least one network structure of: a structure with two continuous layers including a convolution layer and a batch norm layer, a structure with two continuous layers including a convolution layer and a scale layer, and a structure with three continuous layers including a convolution layer, a batch norm layer, and a scale layer, deleting a redundant layer in the network structure, and optimizing model parameters in the convolution layer to obtain a second optimization network structure.

9. The method of claim 8, wherein optimizing the model parameters in the convolution layer includes:

obtaining first configuration parameters and second configuration parameters, wherein the first configuration parameters include first training parameters of the batch norm layer and second training parameters of the batch norm layer, and the second configuration parameters include first training parameters of the scale layer and second training parameters of the scale layer, fusing the first training parameters of the batch norm layer, the first training parameters of the scale layer, and weight parameters of the convolution layer to obtain a first fusion result, fusing the second training parameters of the batch norm layer, the second training parameters of the scale layer, and bias parameters of the convolution layer to obtain a second fusion result, and optimizing a convolution neural network according to the first fusion result and the second fusion result.

10. The method of claim 8, wherein optimizing the model parameters in the convolution layer includes:

obtaining configuration parameters, wherein the configuration parameters include first training parameters of the batch norm layer and second training parameters of the batch norm layer, fusing the first training parameters of the batch norm layer and weight parameters of the convolution layer to obtain a first fusion result, fusing the second training parameters of the batch norm layer and bias parameters of the convolution layer to obtain a second fusion result, and optimizing a convolution neural network according to the first fusion result and the second fusion result.

11. The method of claim 8, wherein optimizing the model parameters in the convolution layer includes:

obtaining configuration parameters, wherein the configuration parameters include first training parameters of the scale layer and second training parameters of the scale layer, fusing the first training parameters of the scale layer and weight parameters of the convolution layer to obtain a first fusion result, fusing the second training parameters of the scale layer and bias parameters of the convolution layer to obtain a second fusion result, and optimizing a convolution neural network according to the first fusion result and the second fusion result.

* * * * *